No. 694,049. Patented Feb. 25, 1902.
F. AUER.
SHADE ROLLER BRACKET.
(Application filed Sept. 26, 1901.)
(No Model.) 2 Sheets—Sheet 1.

WITNESSES:
Geo. D. Richards
John G. Tindell

INVENTOR:
FREDERICK AUER,
BY
Fred'k C. Fraentzel,
ATTORNEY

THE NORRIS PETERS CO., PHOTO-LITHO., WASHINGTON, D. C.

No. 694,049. Patented Feb. 25, 1902.
F. AUER.
SHADE ROLLER BRACKET.
(Application filed Sept. 26, 1901.)
(No Model.) 2 Sheets—Sheet 2.

WITNESSES:
Geo. A. Richards

INVENTOR:
FREDERICK AUER,
BY
Fred'k C. Fraentzel,
ATTORNEY

UNITED STATES PATENT OFFICE.

FREDERICK AUER, OF NEWARK, NEW JERSEY.

SHADE-ROLLER BRACKET.

SPECIFICATION forming part of Letters Patent No. 694,049, dated February 25, 1902.

Application filed September 26, 1901. Serial No. 76,597. (No model.)

*To all whom it may concern:*

Be it known that I, FREDERICK AUER, a citizen of the United States, residing at Newark, in the county of Essex and State of New Jersey, have invented certain new and useful Improvements in Shade-Roller Brackets; and I do hereby declare the following to be a full, clear, and exact description of the invention, such as will enable others skilled in the art to which it appertains to make and use the same, reference being had to the accompanying drawings, and to figures of reference marked thereon, which form a part of this specification.
This invention has reference to improvements in adjustable brackets for supporting shade-rollers to window-frames; and the invention has for its principal object to provide a simple and cheaply-constructed bracket having a slidably-arranged member, enabling the adjustment of the bracket to suit the different widths of shades and to accommodate the brackets to varying lengths of the shade-rollers to avoid the cutting and fitting of the shade-roller between a pair of brackets secured in fixed positions upon the window-frame.

My invention therefore consists in the novel construction of shade-roller bracket hereinafter more fully set forth; and the invention consists, furthermore, in the several improved arrangements and combinations of the various parts, all of which will be described more in detail in the following specification and then finally embodied in the clauses of the claim, which are appended to and form a part of this specification.

Figure 1:
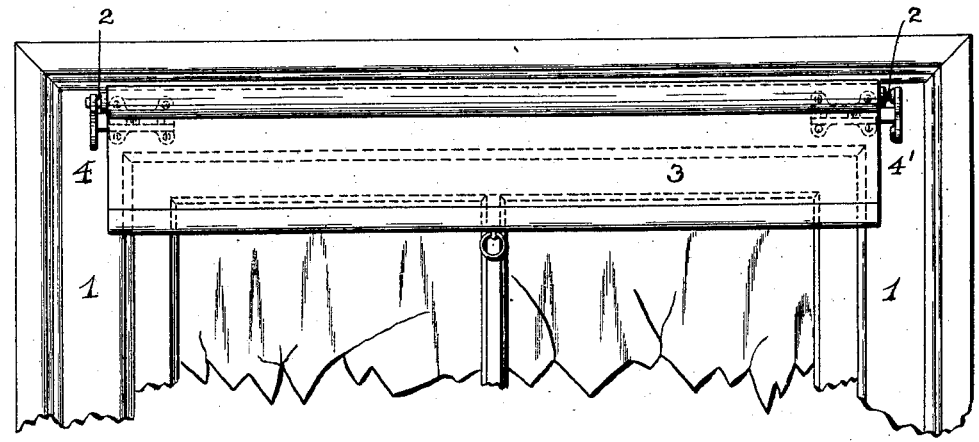
Figure 2:
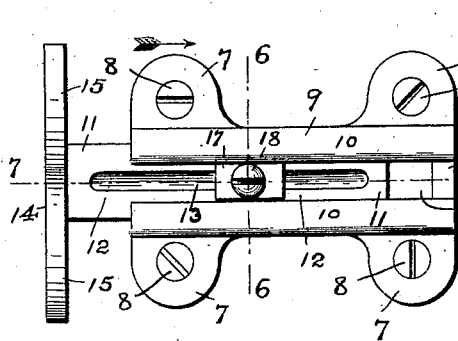
Figures 3, 4:
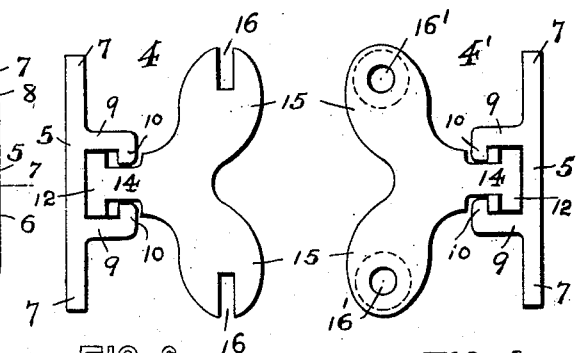
Figure 5:
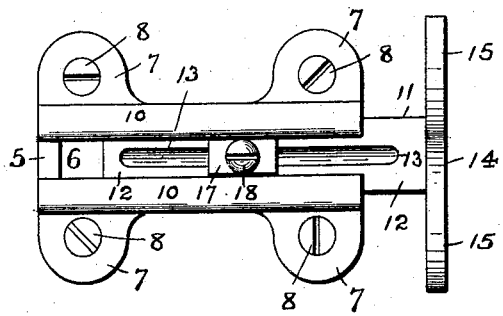
Figure 7:
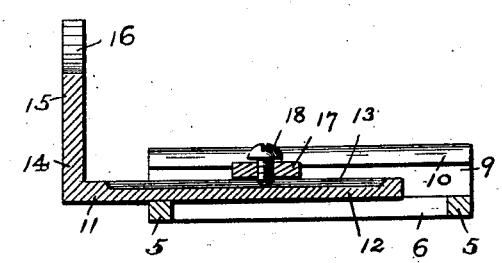
Figure 6:
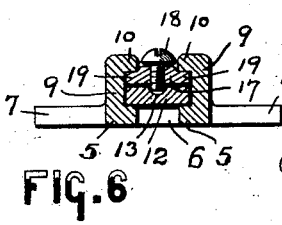
Figure 8:
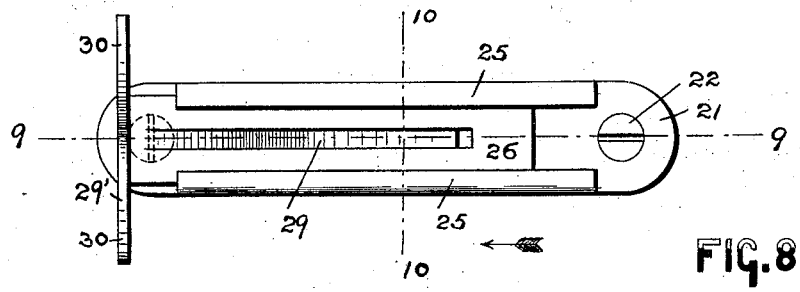
Figure 9:
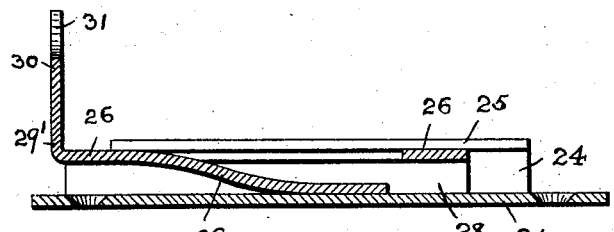
Figure 10:
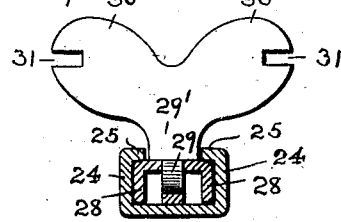
Figure 11:
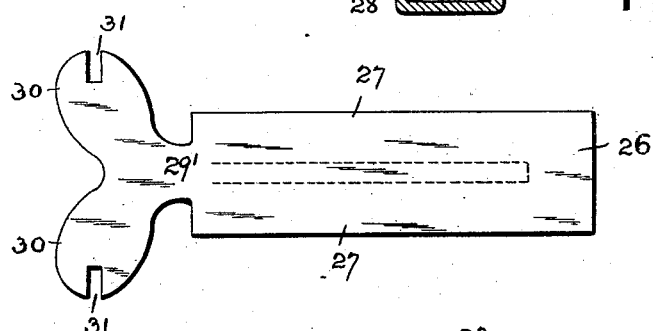
Figure 12:
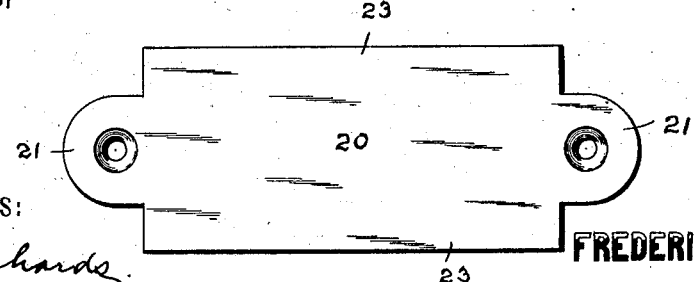

The invention is clearly illustrated in the accompanying drawings, in which—
Figure 1 is a front view of a portion of a window-frame, showing a pair of shade-roller brackets which embody the principles of this invention in position with a shade-roller and shade supported between the brackets.
Fig. 2 is a face view of one of the brackets and its adjustable and reversibly-arranged slide, and Figs. 3 and 4 are end views of the two brackets employed with a shade-roller. Fig. 5 is a face view of one of the brackets similar to that represented in Fig. 2, but illustrating the adjustable slide in its reversed position. Fig. 6 is a vertical cross-section taken on lines 6 6 in said Fig. 2, and Fig. 7 is a longitudinal vertical section taken on line 7 7 in said Fig. 2. Fig. 8 is a face view of modified form of sheet-metal shade-roller bracket made according to my present invention. Fig. 9 is a longitudinal vertical section of this form of bracket, said section being taken on line 9 9 in Fig. 8; and Fig. 10 is a vertical cross-section of the same, the said section being taken on line 10 10 in said Fig. 8. Figs. 11 and 12 are views of blanks of sheet metal from which the two members of the bracket represented in Figs. 8, 9, and 10 are forced into shape.

Similar characters of reference are employed in all of the said above-described views to indicate corresponding parts.
Referring to the said Figs. 1 to 7, inclusive, the reference-numeral 1 indicates the window-frame. 2 indicates the journals of the ordinary shade-roller, which is provided with the shade 3, as clearly represented in Fig. 1. The two brackets are indicated, respectively, by the reference characters 4 and 4', the said brackets being clearly represented in end view in Figs. 3 and 4. The said brackets are preferably made from cast metal and consist, essentially, of a block or plate 5, preferably provided with a longitudinal slot or opening 6 and formed with oppositely-projecting lugs or ears 7, which are perforated and are for the reception of screws or nails 8, by means of which the said blocks or plates 5 are suitably secured in fixed positions upon the window-frame. Each block or plate 5 is also formed with a pair of upwardly-projecting and longitudinally-extending ribs 9, the said ribs being made at their upper and free edges with oppositely-arranged shoulders or projections 10, which extend inwardly and toward each other, as clearly indicated in the several figures of the drawings. It will thus be evident that the said longitudinal ribs 9 and their shoulders or projections 10 provide a suitable guide, which is open at both ends and in which is adjustably and reversibly arranged a slide 11, which is employed for supporting the ends of the shade-roller by means of its journals 2 in the manner to be presently described. Each slide 11 consists, essentially, of a main body 12, preferably formed with the longitudinally-extending groove 13 and an outwardlyprojecting and suitably-ornamented bearing-post 14. The post 14 of each slide is provided with oppositely-extending members or supports 15, in which there are the bearings 16 and 16', as indicated in Figs. 3 and 4, for the reception of the journals 2 of the shade-rollers. The said slide 11 can be suitably placed between the guides of the blocks or plates 5, as will be clearly understood from an inspection of the several figures of the drawings, and is held in its adjusted position between said guides by a nut-shaped block 17 and a suitably-constructed screw 18. From an inspection of Figs. 6 and 7 it will be seen that when the slides have been adjusted so that the journals 2 of the shade-roller can be quickly and easily placed in the bearings 16 and 16' all that is necessary is to screw down the screw 18, thereby forcing the lower end of the screw down into the longitudinal groove 13 of the main body 12 of the slide 11 and bringing the ends 19 of the nut-shaped block 17, which extend beneath the shoulders or projections 10 of the ribs 9, into binding engagement with the under surfaces of the said shoulders or projections 10, as more particularly illustrated in Fig. 6 of the drawings. It will thus be evident that one or both of the said slides can be fixed in positive positions and may be quickly adjusted or reversed to accommodate shade-rollers of different lengths, and in this manner a shade may be hung without any necessity for exact measurements. The reversible arrangement of the slides permits of the attachment of the brackets to any suitable parts of the upper piece of the window-frame and also provides for a large range of adjustment of the parts of the brackets for supporting extra-long shade-rollers.

In lieu of the construction of cast-metal brackets just described I may use the modified form of bracket illustrated in Figs. 8 to 12, inclusive, these brackets being made of sheet metal, as has been previously stated. Each bracket consists, essentially, of a blank 20, provided with suitably-disposed and perforated ears 21 for the reception of screws or nails 22, by means of which the said plates can be secured in position upon the window-frame. The longitudinal edge portions or members 23 of the said blank 20 are bent at right angles, or approximately so, to the upper face of the blank, so as to provide a pair of upwardly-projecting guide-ribs 24, having their upper edges bent toward each other and forming the projections or shoulders 25. The sheet-metal slide, which is indicated by the reference-numeral 26, has its longitudinal edge portions 27 bent so as to provide a pair of downwardly-extending supporting-ribs 28, by means of which the said slide can be reversibly and slidably arranged between the guide-ribs 24 and beneath the two shoulders or projections 25 of the blank 20, as shown. A spring-tongue 29 is forced out of the central part of the blank 26, (on the dotted lines indicated in Fig. 11,) by means of which the slide is readily held in its adjusted position upon the blank 20, between the guide-ribs thereof, as clearly indicated in Fig. 9 of the drawings. The blanks 26 are also formed at the one end of each blank with a right-angled post 29', each post having the oppositely-extending members or supports 30, in which there are the usual bearings, as 31, for the arrangement within said bearings of the journals of the shade-roller. The manner of attachment of these forms of brackets and the adjustment and reversibility of the slides are similar to that described hereinabove in connection with the construction of brackets represented in Figs. 1 to 7, inclusive.

I am aware that changes and modifications may be made in the arrangement and combinations of the various parts without departing from the scope of my present invention. Hence I do not limit my invention to the exact arrangements and combinations of the various parts as described in the previous specification and as illustrated in the accompanying drawings, nor do I confine myself to the minor details of the construction of the said parts.

Having thus described my invention, what I claim is—

1. In a bracket for supporting shade-rollers, the combination, with a plate adapted to be fixed against a window-frame, of a pair of upwardly-projecting and longitudinally-extending ribs, inwardly-extending and oppositely-placed shoulders on said ribs, a slide adjustably arranged between said ribs, provided with a longitudinally-extending groove, a block arranged above said groove having its edges projecting beneath said shoulders, and means connected with said block and having a portion extending into said groove for causing the edges of said block to bind against the said shoulders and thereby securing said slide in its adjusted position, substantially as and for the purposes set forth.

2. In a bracket for supporting shade-rollers, the combination, with a plate adapted to be fixed against a window-frame, of a pair of upwardly-projecting and longitudinally-extending ribs, inwardly-extending and oppositely-placed shoulders on said ribs, a slide adjustably arranged between said ribs, and means for securing said slide in its adjusted position, consisting, essentially, of a nut-like block and a screw, the said block having its opposite ends arranged beneath the shoulders of said ribs, and being brought in holding engagement with said shoulders by the turning of the said screw, substantially as and for the purposes set forth.

3. In a bracket for supporting shade-rollers, the combination, with a plate adapted to be fixed against a window-frame, of a pair of upwardly-projecting and longitudinally-extending ribs, inwardly-extending and oppositely-placed shoulders on said ribs, a slide adjustably arranged between said ribs, provided with a longitudinally-extending groove, a block arranged above said groove having its edges projecting beneath said shoulders, a bearing-post on said slide, a pair of oppositely-extending supports on said post, said supports being provided with bearings, and means connected with said block and having a portion extending into said groove for causing the edges of said block to bind against the said shoulders and thereby securing said slide in its adjusted position between said ribs, substantially as and for the purposes set forth.

4. In a bracket for supporting shade-rollers, the combination, with a plate adapted to be fixed against a window-frame, of a pair of upwardly-projecting and longitudinally-extending ribs, inwardly-extending and oppositely-placed shoulders on said ribs, a slide adjustably arranged between said ribs, a bearing-post on said slide, a pair of oppositely-extending supports on said post, said supports being provided with bearings, and means for securing said slide in its adjusted position, consisting essentially, of a nut-like block and a screw, the block having its opposite ends arranged beneath the shoulders of said ribs, and being brought in holding engagement with the said shoulders by the turning of the said screw, substantially as and for the purposes set forth.

In testimony that I claim the invention set forth above I have hereunto set my hand this 25th day of September, 1901.

FREDERICK AUER.

Witnesses:
FREDK. C. FRAENTZEL,
GEO. D. RICHARDS.